UNITED STATES PATENT OFFICE.

MEINHARD ALSBERG, OF NEW YORK, N. Y.

PROCESS OF MANUFACTURING RED LEAD.

SPECIFICATION forming part of Letters Patent No. 431,026, dated July 1, 1890.

Application filed July 26, 1889. Serial No. 318,745. (No specimens.)

*To all whom it may concern:*

Be it known that I, MEINHARD ALSBERG, a citizen of the United States, and a resident of New York, in the county and State of New York, have invented a new and useful Improvement in the Process of Manufacturing Minium, of which the following is a specification.

Heretofore minium in its commercial forms of red lead or orange mineral has been manufactured by exposing oxide of lead (litharge) or hydrocarbonate of lead (white lead) for a long time to air at a temperature between 500° and 600° Fahrenheit. The monoxide of lead—*i. e.*, litharge or oxide resulting from the decomposition of the carbonate—absorbs oxygen, forming a triplumbic tetroxide or plumbic plumbate which possesses a more or less red color. According to the state of fineness of the material employed the oxidation is more or less complete, and it is almost impossible to so control the absorption of oxygen as to have the whole of the material converted into triplumbic tetroxide.

The object of my invention is to provide better and more certain means of oxidation and to reduce the time and labor required for the same.

To this end my invention consists in incorporating nitrate of lead into the material employed, which may be either oxide or carbonate of lead, and exposing the mixture to a moderate heat sufficiently high to decompose the nitrate of lead and by the oxygen of the nitric acid convert the lead monoxide into the triplumbic tetroxide, (or plumbic plumbate,) but not high enough to decompose this latter and reconvert it into the monoxide. The nitrate of lead by its decomposition supplies oxygen for the conversion of the plumbic monoxide into triplumbic tetroxide without leaving any foreign substance which might either combine with the lead oxide or have to be removed by lixiviation.

In carrying out my invention I mix dilute nitric acid with either litharge or white lead, thereby obtaining a mixture of basic lead nitrate with lead oxide or lead carbonate. This mixture I expose to a heat of about 700° to 900° Fahrenheit. The reaction—*i. e.*, the decomposition of nitrate of lead and the formation of minium—takes place at about the melting-point of zinc, which is 775.5° Fahrenheit, or at an incipient red heat. Care must be taken not to heat up to a red heat, at which minium is decomposed and fusion takes place. The process may be carried on by placing the material upon the hearth of a reverberatory furnace or of a muffle, or the mass may be packed into iron or clay trays or pots. By the application of heat any water that may be contained in the mass is first evaporated, and when the temperature rises to about the melting-point of zinc the lead nitrate is decomposed and supplies oxygen for the formation of minium. Access of air or stirring the mass are not absolutely necessary when a sufficient quantity of nitric acid has been used; but when the mass is heated in a muffle or on the hearth of a reverberatory furnace it should be stirred from time to time.

In place of incorporating nitrate of lead into the material by forming it within the same, as above described, nitrate of lead already formed may be incorporated into the material, either dry or, preferably, as an aqueous solution, which latter insures a more intimate mixture.

In practice I use for one hundred parts, by weight, of litharge about 7.1 parts of hydrogen nitrate—*i. e.*, nitric acid—diluted with sufficient water to make about 12.5 parts; or I take for one hundred parts of litharge 18.6 parts of lead nitrate and fifteen parts of water. In the case of white lead I take a quantity containing one hundred parts of lead oxide.

My invention, however, is not restricted to the above-mentioned proportions. I have obtained a good color by heating a mixture of one hundred parts of litharge and five parts of lead nitrate, giving the air free access to the mass, whereas the same kind of litharge without the addition of lead nitrate exposed to the same degree of heat for the same length of time did not change its color materially. Likewise a larger quantity of lead nitrate may be employed, provided care be taken to decompose the nitrate completely.

For the finest quality of orange mineral I use, by preference, litharge produced by burning atomized lead or lead carbonate precipitated from a basic lead acetate solution by carbonic acid, (so-called "French process" white lead.)

What I claim as my invention is—

The within-described process of producing minium, which consists in incorporating lead nitrate into the material, (oxide or carbonate of lead,) and exposing the resulting mixture to heat sufficiently high to first drive off any water that may be contained in it, and then to decompose the lead nitrate, thereby furnishing oxygen for the formation of minium.

In testimony that I claim the foregoing as my invention I have signed my name, in presence of two witnesses, this 24th day of July, 1889.

MEINHARD ALSBERG.

Witnesses:
A. FABER DU FAUR,
H. W. HELFER.